United States Patent Office 2,702,197
Patented Feb. 15, 1955

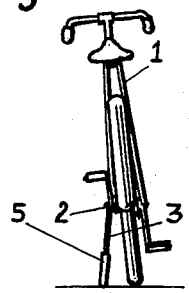
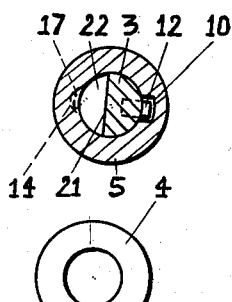
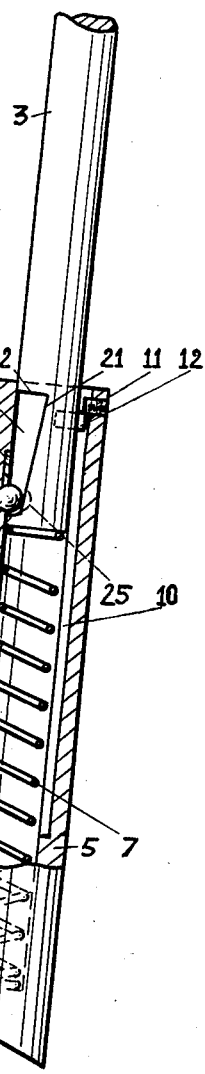
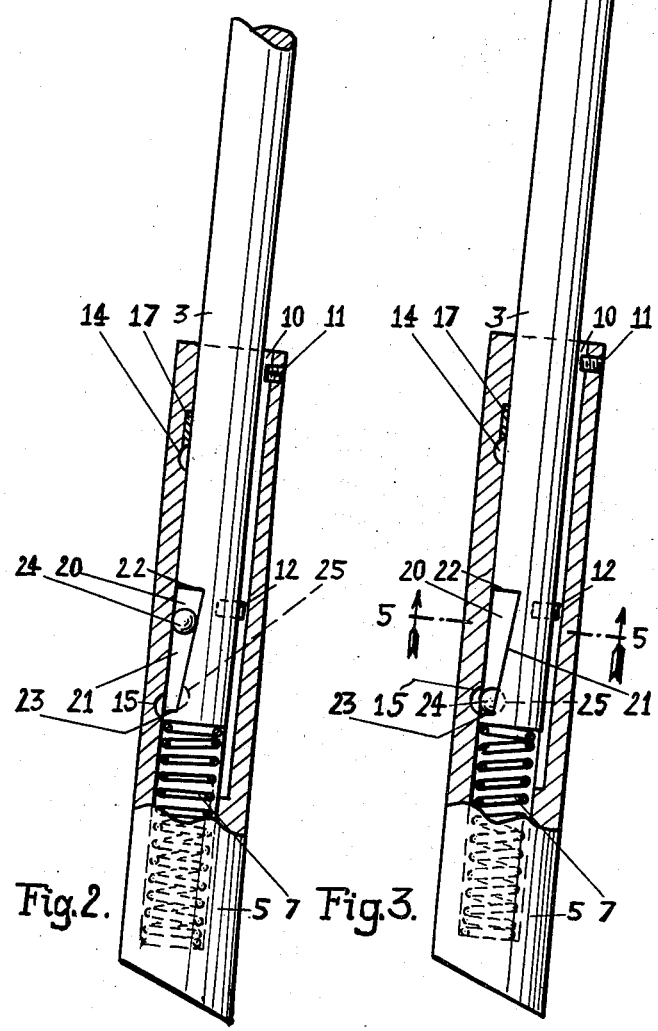

2,702,197

ADJUSTABLE KICKSTAND LEG FOR BICYCLES

Leo C. Sabatino, West Rutland, Vt.

Application September 29, 1953, Serial No. 383,006

2 Claims. (Cl. 280—298)

The present invention relates to improvements in stands and supports for two-wheeled vehicles such as bicycles, motorcycles, and the like. More specifically, the invention relates to a new and improved adjustable kickstand leg for bicycles and the like.

The hitherto known kickstand legs for bicycles and the like consist of stiff rods pivoted to the frame of the vehicle, which are moved into position by swinging them laterally with the foot. Since such a rod is always of the same length it is often difficult to adjust it properly to the unevennesses of the ground on which the vehicle is placed and is to be parked.

Therefore, one object of the present invention is the provision of a device of the character described which is longitudinally adjustable, and which can be adjusted automatically simply by rocking the vehicle into the properly inclined position, so that it cannot fall to the ground but will be held safely in its parking position.

Another object of the present invention is the provision of a device of the character described which does not require the operator to bend down in order to manipulate the device, but which automatically expands to the desired length, and which—after parking—can be contracted and brought back into its most favorable position for riding the vehicle simply by again rocking the vehicle and tilting the kickstand leg in the usual manner.

A further object of the present invention is the provision of a device of the character described which can be attached simply and easily to any vehicle in place of an ordinary kickstand leg, and which requires no structural alterations of the vehicle or of the present, ordinary stand or support bracket.

Yet still another object of the present invention is the provision of a device of the character described which is light in weight, small in size, and simple in construction and use, but which is also durable, sturdy, and well adapted for the rough usage to which devices of this type ordinarily are subjected.

With the foregoing and other objects in view which will appear as the description proceeds, the invention consists of certain novel details of construction and combinations of parts hereinafter more fully described and pointed out in the claims, it being understood that changes may be made in the construction and arrangements of parts without departing from the spirit of the invention as claimed.

In the accompanying drawing a preferred form of the invention has been shown.

In said drawing:

Figure 1 is a rear elevation of a parked bicycle with an embodiment of my invention attached thereto:

Fig. 2 is an enlarged fractional longitudinal sectional view of my new and improved kickstand leg shown in a parking position;

Fig. 3 is a sectional view as Fig. 2, showing one end position;

Fig. 4 is a sectional view as Fig. 2, showing another end position; and

Fig. 5 is a sectional view on the line 5—5 of Fig. 3.

Similar reference characters refer to similar parts throughout the several views.

In the drawing the numeral 1 denotes a bicycle to the frame of which is pivoted at 2 a rod 3, one end of which is formed as a lug 4 or the like in a well-known manner for facilitating its pivotable attachment to the vehicle 1. The rod 3 extends slidably into a cylindrical foot member 5, and a spring 7, or any other suitable resilient member, tends to force the rod 3 toward the open end, and out of, the member 5. A longitudinal groove 10 is provided at the inner side of the member 5, and a screw 11 is screwed through a wall section of the member 5 near its open end, and is extended into the groove 10. A pin 12 is radially extended from the rod 3 into the groove 10 for limiting the longitudinal movement of the member 5 and for preventing a turning thereof relative to the rod 3. Opposite the groove 10 there are provided in the member 5 notches 14 and 15, which preferably are of a substantially semi-spherical formation, and a magnet 17 is secured to the inner side of the member 5 adjacent the notch 14. That end portion of the rod 3 which is slidable within the member 5 has opposite the pin 12 an excavation 20, which has a longitudinal inclined surface 21 and end surfaces 22 and 23. A ball 24 of steel, or of any other suitable material which can be attracted by the magnet 17, is inserted into the recess 20. The lower closed end of the member 5 preferably is wedge-shaped as shown, or it may be of any other suitable shape or design and/or provided with a foot member (not shown) of rubber or of any other suitable material.

The operation of my new and improved kickstand leg is as follows:

The spring 7 tends to force the member 5 downwardly into the position shown in Fig. 4. Shortly before the member 5 has reached this position the ball 24 will be forced by the inclined surface 21 into the notch 14. When the vehicle 1 is being swung in such a direction that the rod 3 will be forced into the member 5, the ball will be held by the magnet 17 in the notch 14 until the surface 22 has reached the ball 24 and pushes it out of the notch 14, so that the ball will permit a further sliding of the rod 3 into the member 5. When the desired angular position of the vehicle 1 has been reached, the vehicle 1 is being pushed a little further in the same direction, or is rocked—with the wheels constituting pivots—so that the spring 7 will force the rod 3 a small distance toward the open end of the member 5, thereby the ball 24 moving away from the surface 22 and wedging itself between the surface 21 and the inner side of the member 5. Thus the rod 3 will be held firmly in the proper parking position in the member 5, as is illustrated in Fig. 2.

At the end of the parking period, the parking position of the device can be changed simply by tilting the vehicle 1 so far that the rod 2 reaches its deepest end position in the member 5 (Fig. 3). In this position the ball 24 will be forced first into the notch 15, and upon a short tilting in the opposite direction into a recess 25 provided in the inclined surface 21. The recess 25 is so dimensioned as to allow the ball to act no longer as a wedging member, so that the spring 7 can force the member 5 from the position shown in Fig. 3 back into the position shown in Fig. 4. Thus the device can be adjusted and manipulated simply by rocking the vehicle 1 in the manner described above. Although the vehicle 1 shown in Fig. 1 is a bicycle it will be obvious that my new and improved kickstand leg can be used also in connection with any other two-wheeled vehicles or the like.

Since certain changes may be made in the above article and different embodiments of the invention could be made without departing from the scope thereof, it is intended that all matter contained in the above description or shown in the accompanying drawing shall be interpreted as illustrative and not in a limiting sense.

Having thus fully described my said invention, what I claim as new and desire to secure by Letters Patent is:

1. A device of the character described comprising a rod constructed and arranged for pivotable attachment to a frame of a two-wheeled vehicle and having a recess which is inclined from the center portion of the rod toward a portion of its periphery, a cylindrical member having a closed end and an open end into which said rod is slidably extended and being provided at its inner side with a pair of notches the first of which is intermediate its ends and the second of which is near the open end of the cylindrical member, a magnet inserted into said cylindrical member adjacent said second notch, a ball consisting of a material which can be attracted by a magnet being inserted in the recess of said rod, resilient means within said cylindrical member tending to force said rod out of said cylindrical member, and means for limting the movement of said cylindrical member relative to said rod.

2. A device of the character described comprising a rod constructed and arranged for pivotable attachment to a frame of a two-wheeled vehicle and having a recess which is inclined from an axial portion of the rod toward its periphery and has a substantially semi-spherical indentation in that section of its inclined portion which is close to the periphery of the rod, a cylindrical member having a bore provided with a longitudinal groove and having a closed end and an open end into which said rod is slidably extended and being provided at its inner side with a pair of notches the first of which is intermediate its ends and the second of which is near the open end of the cylindrical member, a magnet inserted into said cylindrical member adjacent said second notch, a ball consisting of a material which can be attracted by a magnet being inserted in the recess of said rod, resilient means within said cylindrical member tending to force said rod out of said cylindrical member, a pin radially extending from said rod into the groove of said cylindrical member, and a stop member extending from said rod into said groove near the open end of said cylindrical member, said ball being held in said second notch by said magnet when said rod is in its outwardly extended end position relative to said cylindrical member, and upon forcing said rod partially into said cylindrical member and releasing the same to allow said resilient means to force it toward the open end of said cylindrical member said ball wedging itself between the inner side of said cylindrical member and the inclined portion of said recess so as to prevent a further outward movement of said rod, and said ball being releasable from its last-mentioned wedging position by pushing said rod fully into said cylindrical member thereby forcing said ball into the first notch in said cylindrical member and from there into said indentation of the recess of said rod so that it will allow the rod to be forced toward the open end of said cylindrical member by said resilient means.

References Cited in the file of this patent

UNITED STATES PATENTS

| | | |
|---|---|---|
| 456,347 | Taylor | July 21, 1891 |
| 610,061 | Kirkpatrick | Aug. 30, 1898 |
| 1,858,595 | Parker | May 17, 1932 |
| 2,435,444 | Johnsen | Feb. 3, 1948 |

FOREIGN PATENTS

| | | |
|---|---|---|
| 6,561 | Great Britain | of 1896 |